(12) United States Patent
Lindbery et al.

(10) Patent No.: US 6,611,076 B2
(45) Date of Patent: Aug. 26, 2003

(54) TOOTH TIP FOR A HIGH SPEED GENERATOR

(75) Inventors: John R. Lindbery, Santa Barbara, CA (US); Kourosh Mehrayin, Encinitas, CA (US)

(73) Assignee: Solar Turbines Inc., San Diego, CA (US)

( * ) Notice: Subject to any disclaimer, the term of this patent is extended or adjusted under 35 U.S.C. 154(b) by 264 days.

(21) Appl. No.: 09/742,717

(22) Filed: Dec. 20, 2000

(65) Prior Publication Data

US 2002/0074892 A1 Jun. 20, 2002

(51) Int. Cl.[7] .............................. H02K 1/22; H02K 3/00
(52) U.S. Cl. .................... 310/216; 310/218; 310/214
(58) Field of Search ................... 310/216, 217, 310/214, 254, 184, 256, 42; 29/596–598

(56) References Cited

U.S. PATENT DOCUMENTS

| 1,042,408 | A | * | 10/1912 | Dearborn | 310/214 |
|---|---|---|---|---|---|
| 2,190,887 | A | * | 2/1940 | Schaeren | 310/214 |
| 2,562,254 | A | * | 7/1951 | Andrus | 310/214 |
| 2,736,829 | A | * | 2/1956 | Sills | 310/214 |
| 3,766,417 | A | * | 10/1973 | Hallenbeck | 310/214 |
| 3,898,491 | A | * | 8/1975 | Long et al. | 310/183 |
| 4,990,810 | A | * | 2/1991 | Newhouse | 310/194 |
| 5,949,172 | A | * | 9/1999 | Katagiri | 310/218 |
| 6,225,723 | B1 | * | 5/2001 | Cooper et al. | 310/214 |

* cited by examiner

*Primary Examiner*—Tran Nguyen
(74) *Attorney, Agent, or Firm*—Fred J Baehr

(57) ABSTRACT

Tooth tips, which fit over teeth and distal ends of fingers formed between slots in laminated disks making up a portion of a stator in a generator, facilitate slipping stator windings into the slots from a central opening in the laminated disks; cooperate with wedges to affix stator windings in the slots; and provide a slot gap between adjacent tooth tips, which is substantially smaller than the width of the slots, to reduce slot harmonics and improve performance of the generator.

9 Claims, 2 Drawing Sheets

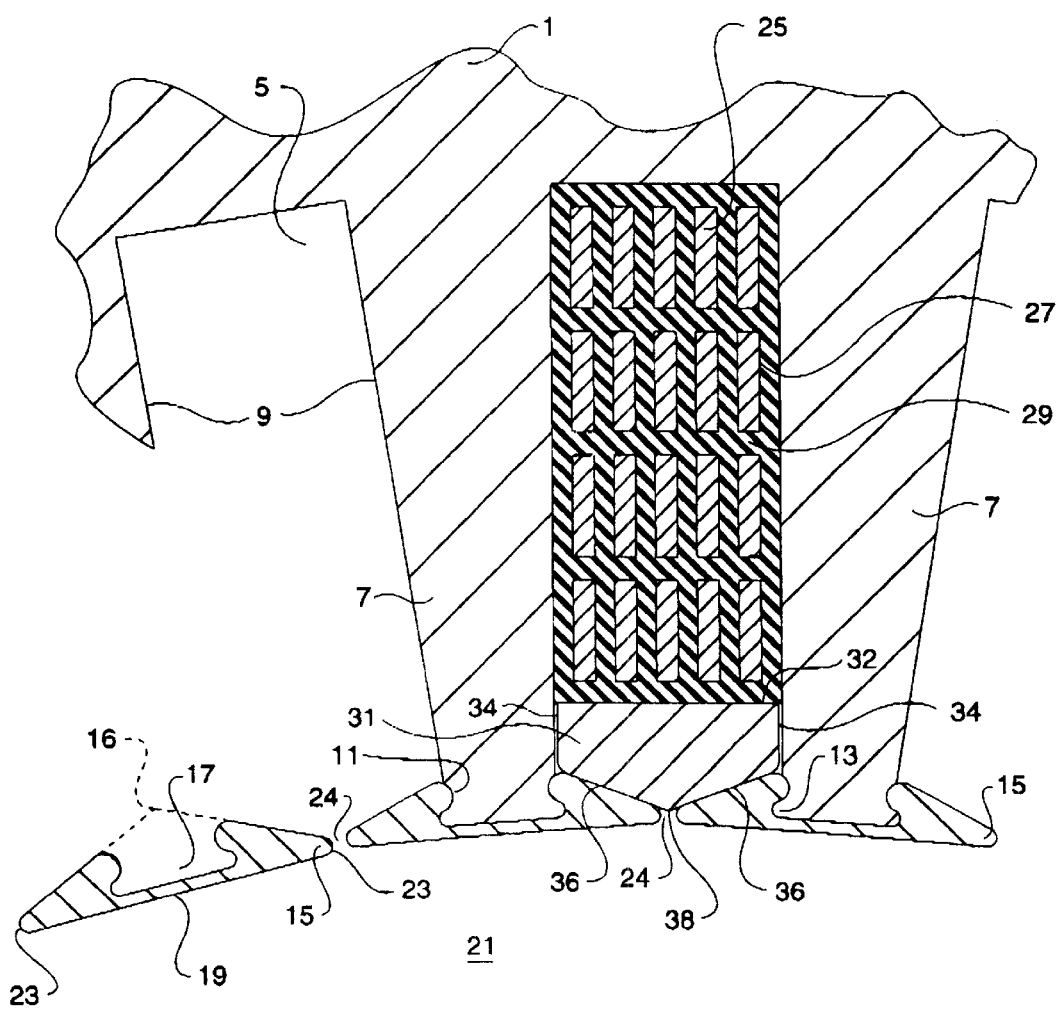

TOOTH TIP FOR A HIGH SPEED GENERATOR

TECHNICAL FIELD

The invention relates to a generator and more particularly to a stator portion of a high speed generator having a stack of laminated disks with radial slots that form fingers with teeth on the distal and a tooth tip fitting over the teeth and distal end of the fingers to hold the stator windings in the slots.

BACKGROUND ART

The design of many generators involve a stator assembly with multiple slots and teeth which accommodate a slot keeper. The shape of the slots and teeth effect the losses caused by the slot harmonics and therefore the performance of the generator. In general it is preferred to have partially closed slots to minimize the effect of slot harmonics. However, in applications involving medium and high voltages the stator windings are made of individual insulated coils. The design of winding coils is such that they need to be inserted into the slots from the center of the stator. Consequently requiring an open slot design. Once the coils are in place the slot keeper is jammed between the teeth to keep the coils in place. This open slot design increases the slot harmonics, which on high power generators can result in a substantial detrimental effect.

DISCLOSURE OF THE INVENTION

In one aspect of the invention a stack of laminated disks form a portion of a stator for positioning stator windings in a generator. Each disk has a central opening and a circular array of slots extending outwardly from the central opening forming a circular array of fingers.

Each finger has a notch disposed on each side thereof forming a tooth on opposite sides of each finger adjacent the distal end thereof.

A tooth tip having an opening registering with the distal end of each finger fits over the teeth and is held in place by the teeth. The tooth tips form a circular opening with a gap, substantially smaller than the width of the slots, between adjacent tooth tips.

The slots are aligned in the stack of laminated disks forming elongated slots for receiving the stator windings.

A wedge is disposed in each of the elongated slots between the stator windings and the tooth tips. The wedges cooperate with the tooth tips to affix the stator windings in the elongated slots and to reduce the slot harmonics and improve performance of the generator.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 2 is an enlarged partial sectional view of a stack of laminated disks with a portion of a stator winding in place.

BEST MODE FOR CARRYING OUT THE INVENTION

Figure 1:
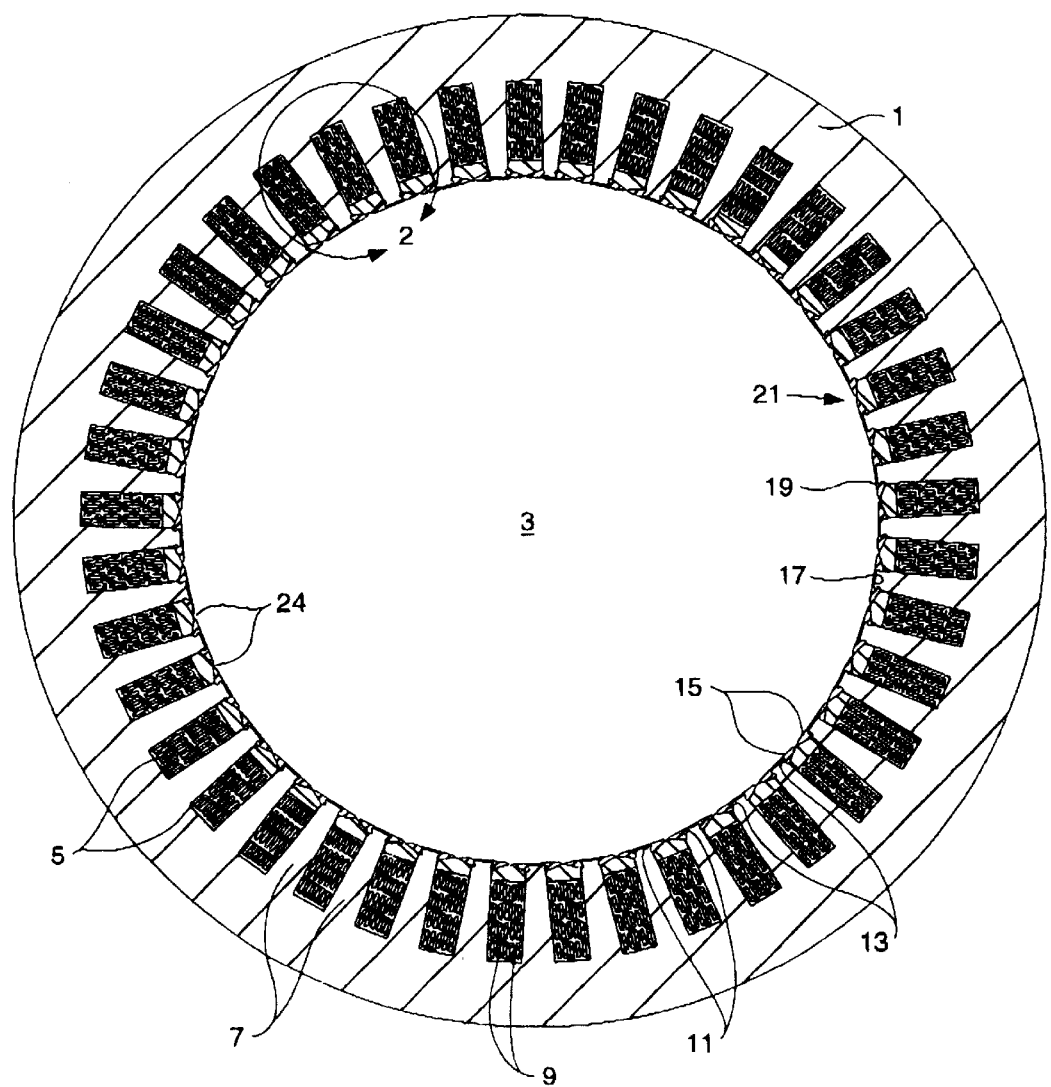
FIG. 1 is an elevational view of a stack of laminated disks forming a portion of a stator of a generator.

Referring now to the drawings in detail and in particular to FIG. 1, there is shown a stack of laminated disks 1 forming a portion of a stator in a high speed generator (not shown). Each disk 1 comprises a central opening 3 and a circular array of slots 5 extending outwardly from the central opening forming a circular array of fingers 7. The slots 5 are disposed on equally spaced radial center lines (not shown). Opposing sides 9 of the slots 5 are disposed parallel to the associated radial center line and are thus parallel. The fingers 7 each have a notch 11 on each side thereof forming a tooth 13 on opposite sides of the finger 7 adjacent the distal end thereof. While various shaped notches 11 may be used, a generally U-shaped notch 11 is preferred. The slots 5 are aligned forming a plurality of elongated slots 5 extending through the stack of laminated disks 1.

A tooth tip 15 having an opening 17 that registers with the distal end of each finger 7, fits over the teeth 13 and is held in place by the teeth 13. The tooth tip 15 is generally in the formed of an equal lateral triangle having the apex cut away to form the registering opening 17. A base portion 19 is curved rather than straight forming a circular opening 21. Sharp points of the base angles are rounded off forming distal ends 23 of the tooth tips 15. There is a gap 24 between the distal ends 23 of adjacent tooth tips 15, which is substantially smaller than the width of the slots 5. The tooth tips 15 are generally the same thickness as the disks 1 and may be made of the same material.

Referring now to FIG. 2 in detail, there is shown a portion of an armature winding 25 disposed in a slot 5 in the laminated disks 1. The winding 25 comprises a plurality of conductors 27 insulated from each other and from the stack of laminated disks 1 by an insulating material 29. A trapezoidal shaped wedge 31 made of a nonconductive, nonmagnetic material such as fiberglass, is disposed in the elongated slots 5 between the tooth tips 15 and the armature winding 25. The wedges 31 cooperate with the tooth tips 15 to affix the armature windings 25 in the elongated slots 5 in the laminated stack of disks 1. As noted herein before, the slots 5 have parallel sides 9, which facilitate slipping the armature windings 25 into the elongated slots 5 from the central opening 3 in the disks 1 prior to the tooth tips 13 being installed on the fingers 7 and over the wedges 31 to secure the armature windings 25 in the elongated slots 5.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

The tooth tips 15 for the stack of laminated disks 1 forming a portion of the stator in the generator set forth herein provides slots 5 with a gap 24 substantially smaller than the width of the slots 5. This significantly reduces the slot harmonics and improves the performance of the generator. The improved performance is accomplished, while facilitating slipping the stator windings 25 into the slots 5 from the central opening 3 in the stack of laminated disks 1.

What is claimed is:

1. A stack of laminated disks forming a portion of a stator for positioning stator windings in a generator, each disk comprising a central opening and a circular array of slots extending outwardly from said central opening forming a circular array of fingers;

each finger having a notch disposed on each side thereof forming a tooth on opposite sides of each finger adjacent distal end thereof;

a tooth tip generally formed in the shape of an equal lateral triangle with an apex portion of said triangle being cut away to form an opening registering with the distal end of each finger, fitting over said teeth and being held in place by said teeth, the base portion of said triangular tooth tips being curved forming a circular opening the points of the base angles of said triangle being rounded off forming a gap between adjacent tooth tips, which is substantially smaller than the width of said slots;

said slots being aligned in said stack of laminated disks forming elongated slots for receiving said stator windings; and a wedge having a generally trapezoidal shape being disposed in each of said elongated slots between said stator windings and said tooth tips and cooperating with said tooth tips to affix said stator windings in said elongated slots reducing slot harmonics and improving performance of the generator.

2. The stack of laminated disks forming the portion of the stator as set forth in claim 1, wherein the trapezoidal shaped wedge being formed from a nonconductive, nonmagnetic material.

3. The stack of laminated disks forming the portion of the stator as set forth in claim 2, wherein the trapezoidal shaped wedge being formed from a fiberglass material.

4. The stack of laminated disks forming the portion of the stator as set forth in claim 1, wherein said slots being disposed on evenly spaced radial centerlines and opposing sides of said slots being parallel to their associated radial centerline facilitating slipping said stator windings into said elongated slots from said central opening.

5. The stack of laminated disks forming the portion of the stator as set forth in claim 1, wherein the tooth tips being the same thickness as the disks.

6. The stack of laminated disks forming the portion of the stator as set forth in claim 1, wherein the tooth tips being made of the same material as the disks.

7. The stack of laminated disks forming the portion of the stator as set forth in claim 2, wherein said slots being disposed on evenly spaced radial centerlines and opposing sides of said slots being parallel to their associated radial centerline facilitating slipping said windings into said elongated slots from said central opening.

8. The stack of laminated disks forming the portion of the stator as set forth in claim 7, wherein the tooth tips being the same thickness as the disks.

9. The stack of laminated disks forming the portion of the stator as set forth in claim 8, wherein the tooth tips being made of the same material as the disks.

* * * * *